(12) United States Patent
Liu (10) Patent No.: US 11,868,002 B2
(45) Date of Patent: Jan. 9, 2024

(54) BACKLIGHT MODULE AND DISPLAY DEVICE HAVING SAME

(71) Applicant: SHENZHEN CHINA STAR OPTOELECTRONICS SEMICONDUCTOR DISPLAY TECHNOLOGY CO., LTD., Shenzhen (CN)

(72) Inventor: Xingyi Liu, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 482 days.

(21) Appl. No.: 17/252,267

(22) PCT Filed: Oct. 27, 2020

(86) PCT No.: PCT/CN2020/123875
§ 371 (c)(1),
(2) Date: Dec. 14, 2020

(87) PCT Pub. No.: WO2022/041448
PCT Pub. Date: Mar. 3, 2022

(65) Prior Publication Data
US 2022/0365392 A1    Nov. 17, 2022

(30) Foreign Application Priority Data

Aug. 27, 2020 (CN) .......................... 202010878885.0

(51) Int. Cl.
*G02F 1/00* (2006.01)
*G02F 1/13357* (2006.01)

(52) U.S. Cl.
CPC .............................. *G02F 1/133603* (2013.01)

(58) Field of Classification Search
None
See application file for complete search history.

(56) References Cited

U.S. PATENT DOCUMENTS

2011/0037685 A1\* 2/2011 Park .................... G02B 6/0068
345/87
2018/0088389 A1   3/2018 Furuta
(Continued)

FOREIGN PATENT DOCUMENTS

CN   104318889 A    1/2015
CN   209460751 U   10/2019
(Continued)

OTHER PUBLICATIONS

International Search Report in International application No. PCT/CN2020/123875, dated Apr. 27, 2021.
(Continued)

*Primary Examiner* — Gerald J Sufleta, II
(74) *Attorney, Agent, or Firm* — PV IP PC; Wei Te Chung; Zhigang Ma (57) ABSTRACT

A backlight module and a display device having same are provided in the present disclosure. The backlight module includes a plurality of backplanes that are combined, where a plurality of light-emitting units are disposed. Each of the light-emitting units includes a first light-emitting unit located in the combining areas of the adjacent backplanes, and a second light-emitting unit located in the other areas of the backplanes. In at least one backplane, a first resistance between the first light-emitting unit and the corresponding power source high-potential signal input terminal is smaller than a second resistance between the second light-emitting unit and the corresponding power source high-potential signal input terminal.

20 Claims, 4 Drawing Sheets

(56) References Cited

U.S. PATENT DOCUMENTS

| | | | |
|---|---|---|---|
| 2019/0339553 A1* | 11/2019 | Jeon | H01L 27/1248 |
| 2020/0073162 A1* | 3/2020 | Shin | G02F 1/133504 |
| 2022/0210889 A1* | 6/2022 | Leitner | H05B 45/347 |
| 2023/0113456 A1* | 4/2023 | Zhou | H05B 45/40 |
| | | | 315/71 |

FOREIGN PATENT DOCUMENTS

| | | |
|---|---|---|
| CN | 111308788 A | 6/2020 |
| CN | 111402830 A | 7/2020 |
| CN | 111429831 A | 7/2020 |
| CN | 111429853 A | 7/2020 |
| CN | 111554246 A | 8/2020 |

OTHER PUBLICATIONS

Written Opinion of the International Search Authority in International application No. PCT/CN2020/123875, dated Apr. 27, 2021.

* cited by examiner

BACKLIGHT MODULE AND DISPLAY DEVICE HAVING SAME

RELATED APPLICATIONS

This application is a Notional Phase of PCT Patent Application No. PCT/CN2020/123875 having international filing date of Oct. 27, 2020, which claims the benefit of priority of Chinese Patent Application No. 202010878885.0 filed on Aug. 27, 2020. The contents of the above applications are all incorporated by reference as if fully set forth herein in their entirety.

FIELD OF INVENTION

The present application relates to the field of display technologies, and in particular to a backlight module and a display device having same.

BACKGROUND OF INVENTION

Mini-light-emitting diode (Mini-LED) backlights have been widely applied and used as backlights of liquid crystal display (LCD) panels because of their characteristics, such as small sizes, capability of achieving super-thin backlights, and capability of achieving multi-partition driving. Mini-LED backlight modules applied for conventional large-size displays are usually formed by combining multiple backplanes. However, because intervals between mini-LEDs located in combining areas between the adjacent backplanes are larger than intervals between the mini-LEDs located in inner areas of the backplanes, an overall brightness of the combining area is lower than an overall brightness of the inner areas. Therefore, display effect is affected.

Therefore, in the conventional mini-LED backlight modules, there is a technical problem of having lower brightness in the combining areas. The technical problem needs to be overcome.

SUMMARY OF INVENTION

Technical Problems

The present disclosure provides a backlight module and a display device having same for overcoming a technical problem of having lower brightness in combining areas in conventional mini-LED backlight modules.

Technical Solutions

To solve the aforementioned problem, the present disclosure provides a technical solution which is as described hereinbelow:

The present disclosure provides a backlight module, comprising: a plurality of backplanes that are combined; wherein each of the plurality of backplanes is provided with a plurality of light-emitting units arranged in an array, and the light-emitting units are electrically connected to a power source high-potential signal input terminal and a power source low-potential signal input terminal, for emitting light under control of a power source high-potential signal and a power source low-potential signal; wherein the light-emitting units include a plurality of first light-emitting units located in combining areas of the adjacent backplanes, and a plurality of second light-emitting units located in other areas of the backplanes; wherein on at least one of the backplanes, a first resistance between the first light-emitting unit and the corresponding power source high-potential signal input terminal is smaller than a second resistance between the second light-emitting unit and the corresponding power source high-potential signal input terminal.

In the backlight module of the present disclosure, the plurality of backplanes are respectively electrically connected to corresponding driving chips through printed circuit boards, and the first resistance and the second resistance are both external resistances provided in the printed circuit board.

In the backlight module of the present disclosure, the first resistance is a variable resistance, and the second resistance is a fixed resistance.

In the backlight module of the present disclosure, the driving chip is configured to control and adjust an actual access resistance value of the first resistance during a working phase of the first light-emitting unit.

In the backlight module of the present disclosure, the driving chip is configured to, according to a brightness difference between the combining area and the other area, query a resistance compensation value corresponding to the brightness difference from a locally stored resistance compensation comparison table, and the resistance compensation value is subtracted from a resistance value of the second resistance to obtain a resistance value of the first resistance.

In the backlight module of the present disclosure, the driving chip is configured to, according to a brightness difference between the combining area and the other area, calculate and obtain a resistance compensation value corresponding to the brightness difference, and the resistance compensation value is subtracted from a resistance value of the second resistance to obtain a resistance value of the first resistance.

In the backlight module of the present disclosure, a resistance of a connecting line between the first light-emitting unit and the corresponding power source high-potential signal input terminal forms the first resistance, and a resistance of a connecting line between the first light-emitting unit and the corresponding power source high-potential signal input terminal forms the second resistance.

In the backlight module of the present disclosure, the light-emitting units in a same column are connected to a same power source high-potential signal line, the power source high-potential signal line includes an in-plane wire and a fan-out wire, and a width of the fan-out wire corresponding to the first light-emitting unit is larger than a width of the fan-out wire corresponding to the second light-emitting unit.

In the backlight module of the present disclosure, for the two adjacent backplanes, a resistance value of the first resistance corresponding to any one of the two adjacent backplanes is greater than a resistance value of the second resistance corresponding to the same backplane.

In the backlight module of the present disclosure, resistance values of the first resistances respectively corresponding to the two backplanes are equal.

In the backlight module of the present disclosure, for the two adjacent backplanes, a resistance value of the first resistance corresponding to one of the two adjacent backplanes is smaller than a resistance value of the second resistance corresponding to the same backplane, and a resistance value of the first resistance corresponding to the other backplane is equal to a resistance value of the second resistance corresponding to the same backplane.

In the backlight module of the present disclosure, in the backplanes, the power source low-potential signals corresponding to each of the light-emitting units are all equal.

In the backlight module of the present disclosure, each of the backplanes further includes a backlight driving circuit for driving the light-emitting units to emit light, and the backlight driving circuit includes:

a data signal input module, configured to input a data signal under control of a scanning signal;

a driving module, connected to the data signal input module, wherein the driving module is configured to drive the light-emitting units to emit light under control of the data signal and the power source high-potential signal; and a storage module, connected to the data signal input module and the driving module, wherein the storage module is configured to store the data signal.

In the backlight module of the present disclosure, each of the light-emitting units includes a plurality of Mini LED lamps connected in series.

The present disclosure provides a display device, comprising: a liquid crystal display panel and a backlight module, wherein the backlight module includes a plurality of backplanes that are combined, each of the backplanes is provided with a plurality of light-emitting units arranged in an array, and the plurality of light-emitting units are electrically connected to a power source high-potential signal input terminal and a power source low-potential signal input terminal, for emitting light under control of a power source high-potential signal and a power source low-potential signal, wherein the light-emitting units include a plurality of first light-emitting units located in combining areas of the adjacent backplanes, a plurality of second light-emitting units located in other areas of the backplanes, and on at least one of the backplanes, a first resistance between the first light-emitting unit and the corresponding power source high-potential signal input terminal is smaller than a second resistance between the second light-emitting unit and the corresponding power source high-potential signal input terminal.

In the display device of the present disclosure, the plurality of backplanes are respectively electrically connected to corresponding driving chips through printed circuit boards, and the first resistance and the second resistance are both external resistances provided in the printed circuit.

In the display device of the present disclosure, the first resistance is a variable resistance, and the second resistance is a fixed resistance.

In the display device of the present disclosure, the driving chip is configured to control and adjust an actual access resistance value of the first resistance during a working stage of the first light-emitting unit.

In the display device of the present disclosure, the driving chip is configured to, according to a brightness difference between the combining area and the other area, query a resistance compensation value corresponding to the brightness difference from a locally stored resistance compensation comparison table, and the resistance compensation value is subtracted from a resistance value of the second resistance to obtain a resistance value of the first resistance.

In the display device of the present disclosure, the driving chip is configured to, according to a brightness difference between the combining area and the other area, calculate and obtain a resistance compensation value corresponding to the brightness difference, and the resistance compensation value is subtracted from a resistance value of the second resistance to obtain a resistance value of the first resistance.

Beneficial Effect:

The present disclosure provides a backlight module and a display device having same. The backlight module includes a plurality of backplanes that are combined, wherein each of the plurality of backplanes is provided with a plurality of light-emitting units arranged in an array, and the light-emitting units are electrically connected to a power source high-potential signal input terminal and a power source low-potential signal input terminal, for emitting light under control of a power source high-potential signal and a power source low-potential signal. The light-emitting units include a plurality of first light-emitting units located in combining areas of the adjacent backplanes, and a plurality of second light-emitting units located in other areas of the backplanes. On at least one of the backplanes, a first resistance between the first light-emitting unit and the corresponding power source high-potential signal input terminal is smaller than a second resistance between the second light-emitting unit and the corresponding power source high-potential signal input terminal. In the present disclosure, the resistance value of the first resistance is set to be smaller than the resistance value of the second resistance, so that the voltage drop of the power source high-potential signal after passing through the first resistance is smaller than the voltage drop of the power source high-potential signal after passing through the second resistance, the voltage difference across the first light-emitting unit is greater than the voltage difference across the second light-emitting unit, and the brightness corresponding to the first light-emitting unit is greater than the brightness corresponding to the second light-emitting unit. As a result, the overall brightness of the first light-emitting units with large intervals therebetween in the combining areas is equal to the overall brightness of the second light-emitting units with small intervals therebetween in other areas, which improves the display effect of the corresponding display device.

DESCRIPTION OF DRAWINGS

In order to more clearly illustrate the technical solution in the embodiment of the present disclosure, the drawings necessary in the description of the embodiment will be introduced briefly below. Obviously, the drawings in the following description are only some embodiments of the present disclosure, and for those ordinary skilled in the art, other drawings can be further obtained based on these drawings without creative works.

DETAILED DESCRIPTION OF PREFERRED EMBODIMENTS

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc. are only directions with regard to the accompanying drawings. Therefore, the directional terms used for describing and illustrating the present disclosure are not intended to limit the present disclosure. In the drawings, units with similar structures are indicated by the same reference number.

The present disclosure provides a backlight module and a display device having same for overcoming a technical problem of having a lower brightness in combining areas in conventional mini-LED backlight modules.

The present disclosure provides the backlight module, comprising: a plurality of backplanes that are combined; wherein each of the plurality of backplanes is provided with a plurality of light-emitting units arranged in an array, and the light-emitting units are electrically connected to a power source high-potential signal input terminal and a power source low-potential signal input terminal, for emitting light under control of a power source high-potential signal and a power source low-potential signal; wherein the light-emitting units include a plurality of first light-emitting units located in combining areas of the adjacent backplanes, and a plurality of second light-emitting units located in other areas of the backplanes; wherein on at least one of the backplanes, a first resistance between the first light-emitting unit and the corresponding power source high-potential signal input terminal is smaller than a second resistance between the second light-emitting unit and the corresponding power source high-potential signal input terminal.

Figure 1:
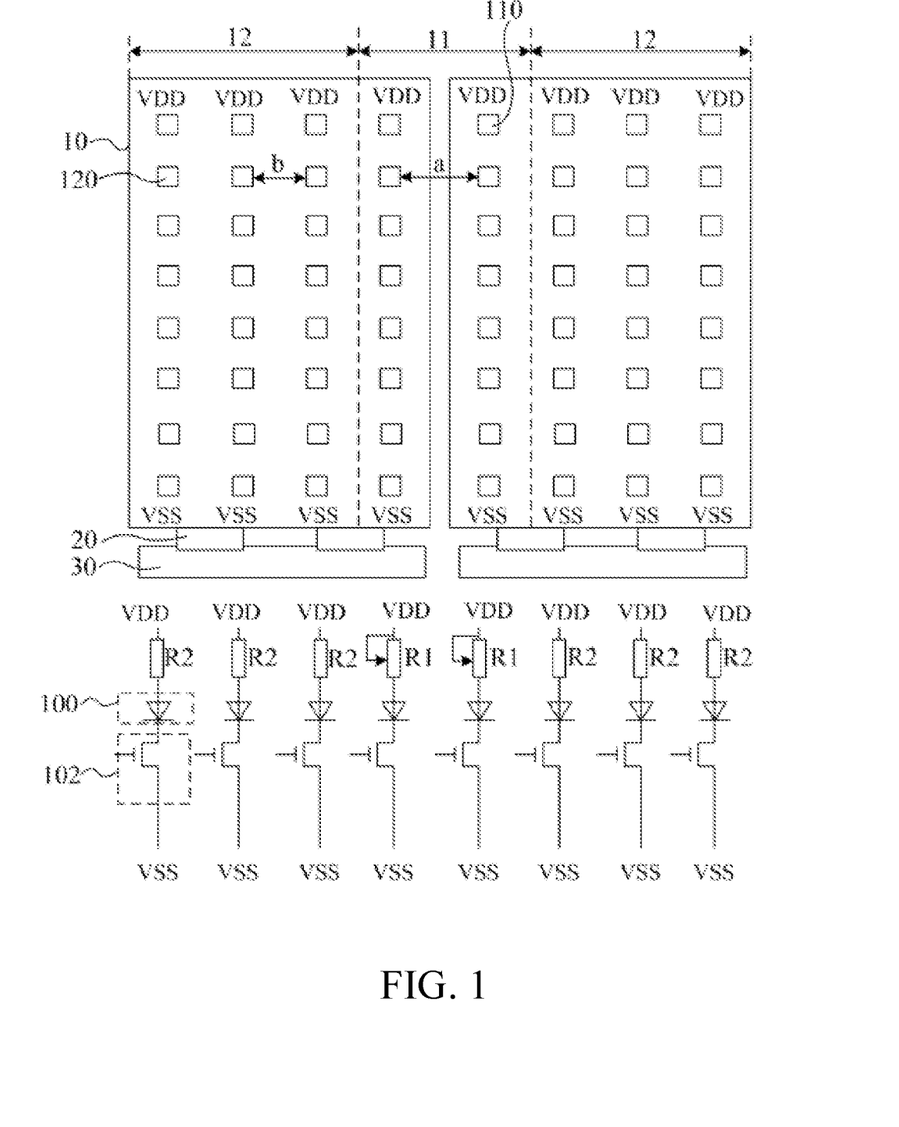
FIG. 1 is a schematic diagram of a first input means of power source high-potential signals in the backlight module provided by the embodiment of the present disclosure.

As shown in FIG. 1, the backlight module of the present disclosure provides backlight for medium-size or large-size liquid crystal display panels. The backlight module is formed by combining a plurality of backplanes 10. A plurality of light-emitting units 100 are disposed on the backplanes 10 in an array. Further, each of the light-emitting units 100 may comprise a plurality of mini LEDs or micro LEDs that are connected in series. A backlight driving circuit in each of the backplanes 10 individually drives each of the light-emitting units 100 on the backplane 10, thereby individually controlling light emission of each of the light-emitting units 100, and thereby individually providing backlight for pixels within each partition of the liquid crystal display panel. Compared with backlight modules adopting whole-screen driving, backlight modules adopting multi-partition driving are more agile in brightness control, and therefore have better light-emitting effect.

The light-emitting units 100 located within combining areas 11 of adjacent backplanes 10 are first light-emitting units 110, and the light-emitting units 100 located within other areas 12 are second light-emitting units 120. Because the backlight module is formed by combining the plurality of backplanes 10, and due to the limitations of manufacturing processes, in two adjacent backplanes 10, an interval a between two columns of first light-emitting units 110 which are located in the combining area 11 are larger than an interval b between any two adjacent columns of the second light-emitting units 120 which are located in the other areas 12. Therefore, when light emission intensity of the first light-emitting units 110 and a light emission intensity of the second light-emitting units 120 is the same, an overall brightness after light mixing in different columns of the first light-emitting units 110 in the combining area 11 is low, an overall brightness after light mixing in different columns of the second light-emitting units 120 of the other areas 12 is high, and seam shadows thus appear in the combining area 11. The seam shadows affect the display effect of the liquid crystal display panel when backlight is provided for liquid crystal display panel.

Figure 4:
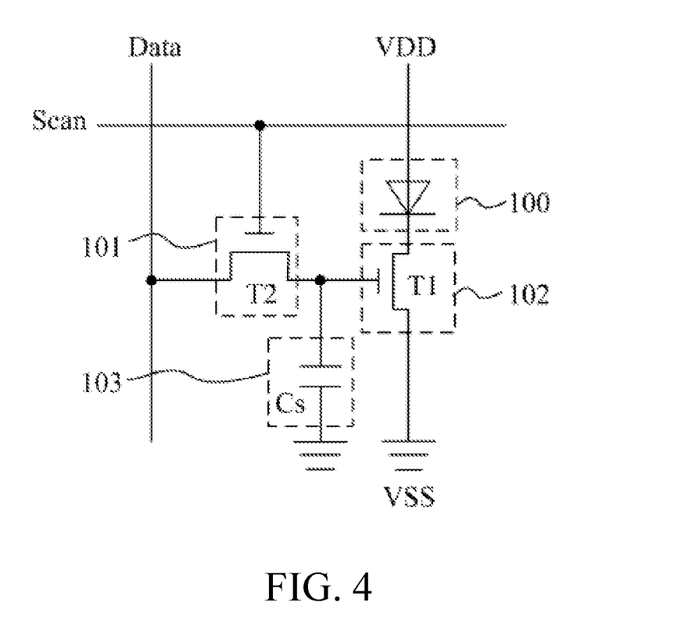
FIG. 4 is a structural schematic view of a backlight driving circuit in the backlight module provided by the embodiment of the present disclosure.

As shown in FIG. 4, the backlight 10 comprises the plurality of light-emitting units 100 that are disposed in an array. All of the plurality of light-emitting units 100 are driven by the backlight driving circuit. The backlight driving circuit comprises a data signal input module 101, a driving module 102, and a storage module 103. The data signal input module 101 is configured to input data signals, Data, under control of scan signals, Scan. The driving module 102 is connected with the data signal input module 101 and is configured for driving the light-emitting units 100 to emit light under control of the data signals, Data, and power source high-potential signals, VDD. The storage module 103 is connected with the data signal input module 101 and the driving module 102, and is used for the storage of the data signals, Data.

Specifically, the data signal input module 101 comprises a switch transistor, T2, the driving module 102 comprises a driving transistor, T1, and the storage module 103 comprises a storage capacitor, Cs. A gate electrode of the switch transistor, T2 is inputted with the scan signals Scan and a first electrode of the switch transistor, T2 is inputted with the data signals, Data. A second electrode of the switch transistor, T2, is connected with a gate electrode of the driving transistor T1 and with a first electrode plate of the storage capacitor, Cs. A second electrode plate of the storage capacitor, Cs, is grounded. A first electrode of the driving transistor, T1, is inputted with the power source high-potential signals, VDD, and a second electrode of the driving transistor T1 is inputted with the power source low-potential signals, VSS.

Working stages of the light-emitting unit 100 include a data writing stage, t1, and a light-emitting stage, t2. During the date writing stage t1, the scan signals Scan are at high electrical potential, and the switch transistor, T2, is switched on. The data signals, Data, are transmitted to the gate electrode of the driving transistor, T1, and are stored in the storage capacitor, Cs. The driving transistor, T1, is switched on, and thus makes the light-emitting unit 100 to emit light. During the light-emitting stage, t2, the scan signals Scan are at low electrical potential, the switch transistor, T2, is switched off, and a gate electrode potential that drives the transistor, T1, may be maintained by the storage capacitor, Cs, thereby making the light-emitting unit 100 to continue emitting light.

The light emission intensity of the light-emitting unit 100 relates to a voltage difference applied across the light-emitting unit 100. The greater the voltage difference is, the greater the light emission intensity of the light-emitting unit 100 is.

As shown in FIG. 1, in the present disclosure, a plurality of backplanes 10 are respectively connected to corresponding driving chips 30 through printed circuit boards 20. In each of the backplanes 10, the light-emitting units 100 in a same column are connected to the same power source high-potential signal line, and the power source high-potential signal input terminal in the driving chip 30 inputs the power source high-potential signal, VDD, to the corresponding column of the light-emitting units 100 through a power source high-potential signal line. When the light-emitting units 100 on the backplane 10 are in operation, all the power source high-potential signals VDD input by the light-emitting units 100 on the entire backplane 10 are equal, and the power source low-potential signals, VSS, are equal as well.

For at least one backplane 10, the first resistance between the first light-emitting unit 110 and the corresponding power source high-potential signal input terminal is smaller than the second resistance between the second light-emitting unit 120 and the corresponding power source high-potential signal input terminal. As shown in FIG. 1, both the first resistance R1 and the second resistance R2 are external resistances provided in the printed circuit board 20. The first resistance R1 is a variable resistance, and the second resistance R2 is a fixed resistance.

Since the light-emitting units 100 in the same column in each of the backplanes 10 are connected to the same power source high-potential signal line, the power source high-potential signal line inputs the same power source high-potential signal, VDD, to the corresponding column of light-emitting units 100. Therefore, when the resistance value between the light-emitting unit 100 and the corresponding power source high-potential signal input terminal in the combing area 11 is reduced, the brightness of the first light-emitting unit 110 always changes in units of columns.

During the working phase of the light-emitting unit 100, the driving chip 30 controls and adjusts the resistance value of the first resistance R1, so that the resistance value of the first resistance R1 is smaller than the resistance value of the second resistance R2. The power source high-potential signal, VDD, and power source low-potential signal, VSS, input by each column of the light-emitting unit 100 on the backplane 10 are equal. After the first resistance R1 and the second resistance R2 are added to the connecting line between the light-emitting unit 100 and the power source high-potential signal input terminal, the voltage dividing function will be achieved, so that the voltage on the side of the light-emitting unit 100 close to the external resistance is reduced. Since the resistance value of the first resistance R1 is smaller than the resistance value of the second resistance R2, the voltage drop of the power source high-potential signal, VDD, after passing through the first resistance R1 is smaller than the voltage drop of the power source high-potential signal, VDD, after passing through the second resistance R2. Thus, the voltage difference across the first light-emitting unit 110 is greater than the voltage difference across the second light-emitting unit 120, and the brightness corresponding to the first light-emitting unit 110 is greater than the brightness corresponding to the second light-emitting unit 120. As a result, the overall brightness of the first light-emitting units 110 with large intervals therebetween in the combining areas 11 is equal to the overall brightness of the second light-emitting unit 120 with small intervals therebetween in the other areas 12, thereby eliminating the seam shadow, and improving the display effect of the corresponding display device.

There are two ways for the driving chip 30 to determine the specific value of the first resistance R1.

In one embodiment, the driving chip 30 is used to query the resistance compensation value corresponding to the brightness difference from the locally stored resistance compensation comparison table according to the brightness difference between the combining area 11 and the other area 12, and the resistance compensation value is subtracted from the resistance value of the second resistance R2 to obtain a resistance value of the first resistance R1. The resistance compensation comparison table is stored in the driving chip 30 in advance. The table includes multiple brightness values or brightness range values. For each brightness value or brightness range value, there is a corresponding resistance compensation value. After the brightness difference between the combining area 11 and other area 12 is obtained, the resistance compensation value corresponding to the brightness difference is found from the resistance compensation comparison table, and then the resistance compensation value is subtracted from the resistance value of the second resistance R2. Adjusting the resistance value of the first resistance R1 actually connected to the line according to the subtracted value can increase the luminous brightness of the first light-emitting unit 110, and the increased luminous brightness can just compensate for the aforementioned brightness difference. It is convenient and fast to obtain the resistance compensation value by looking up the table.

In one embodiment, the driving chip 30 is used to calculate a resistance compensation value corresponding to the brightness difference according to the brightness difference between the combining area 11 and other areas 12, and subtract the resistance compensation value from the resistance value of the second resistance R2 to obtain a resistance value of the first resistance R1. Each brightness value or brightness range value corresponds to a resistance compensation value. After the brightness difference between the combining area 11 and other areas 12 is obtained, the driving chip 30 directly calculates the resistance compensation value corresponding to the brightness difference, and then the resistance compensation value is subtracted from the resistance value of the second resistance R2. Adjusting the resistance value of the first resistance R1 actually connected to the line according to the subtracted value can increase the luminous brightness of the first light-emitting unit 110, and the increased luminous brightness can just compensate for the aforementioned brightness difference. It is accurate to obtain the resistance compensation value by calculation.

In one embodiment, for the two adjacent backplanes 10, a resistance value of the first resistance R1 corresponding to any one of the backplanes 10 is greater than a resistance value of the second resistance R2 corresponding to the same backplane. In addition, as shown in FIG. 1, the luminous brightness of the first light-emitting units 100 in the two columns in each combining area 11 is improved, and thus the overall brightness of the combining area 11 is improved, so as to achieve an improved effect of the seam shadow. When the resistance values of the first resistances R1 corresponding to two the adjacent backplanes 10 are equal, light mixing is uniform, and the brightness is improved.

Figure 2:
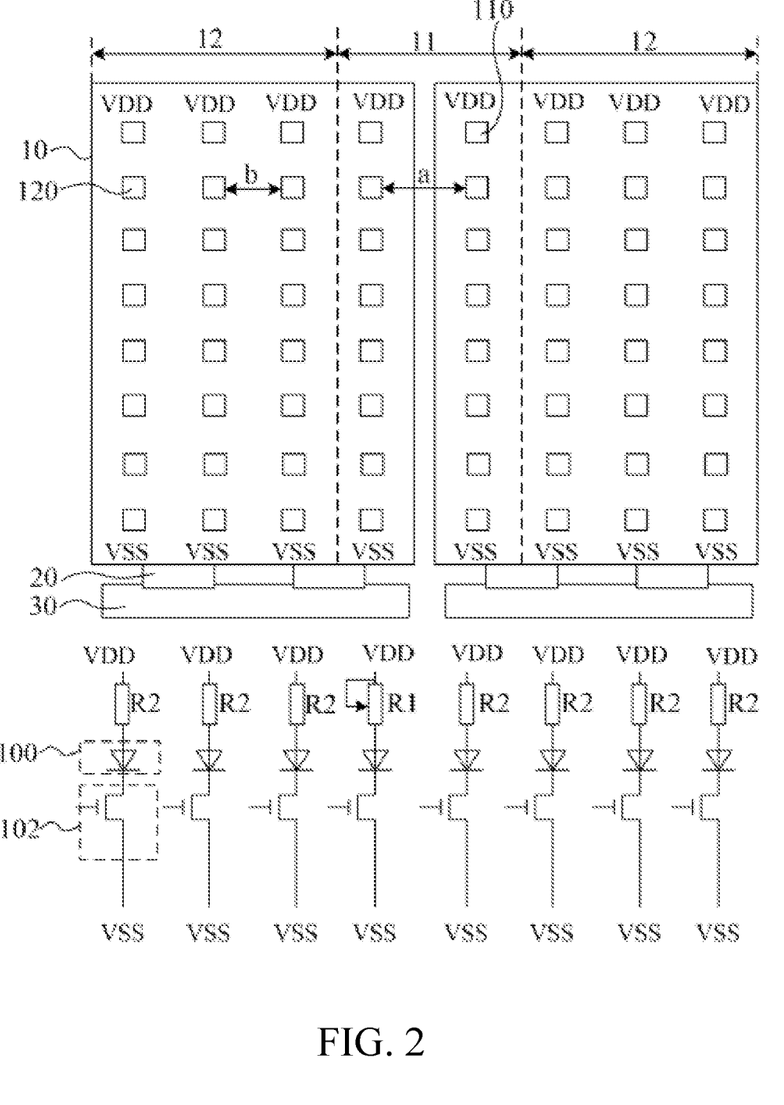
FIG. 2 is a schematic diagram of a second input means of the power source high-potential signals in the backlight module provided by the embodiment of the present disclosure.

In one embodiment, for the two adjacent backplanes 10, a resistance value of the first resistance R1 corresponding to one backplane 10 is less than a resistance value of the second resistance R2 corresponding to the same backplane 10, and a resistance value of the first resistance R1 of the other backplane is equal to a resistance value of the second resistance R2 of the same backplane. As shown in FIG. 2, taking the combining of the two backplanes 10 as an example, the resistance value of the first resistance R1 of the left backplane 10 is greater than the resistance value of the second resistance R2 of the left backplane 10, and the resistance value of the right backplane 10 in the combining area 11 and other areas 12 are equal. That is, the resistance value of the first resistance R1 is equal to the resistance value of the second resistance R2. In addition, for the two columns of the first light-emitting units 110 in each combining area 11, the brightness of one column of the first light-emitting units 110 remains unchanged, while the brightness of the other column of the first light-emitting units 110 increases, thereby enhancing the overall brightness of the combining area 11 to a certain extent. In a case where the brightness difference between the combining area 11 and the other areas 12 is small, the resistance value of the first resistance R1 corresponding to one column of the first light-emitting units 110 can be reduced to increase the brightness. Compared with the embodiment corresponding to FIG. 1, this method not only improves the brightness, but also brings less increase in energy consumption and the lower cost.

In the above-mentioned embodiments, the brightness of the first light-emitting unit 110 is increased by adding a resistance between the light-emitting unit 100 and the power source high-potential signal input terminal. In addition, the same effect can be achieved by adjusting the original circuit.

In an embodiment, a resistance of a connecting line between the first light-emitting unit 110 and the corresponding power source high-potential signal input terminal is regarded as a first resistance R1, and a resistance of a connecting line between the first light-emitting unit 120 and the corresponding power source high-potential signal input terminal is regarded as a second resistance R2.

Figure 3:
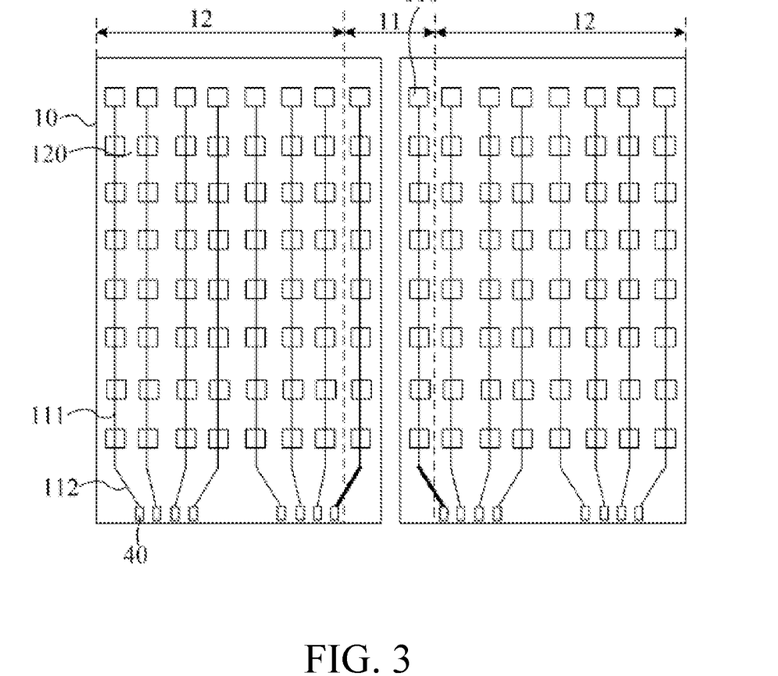
FIG. 3 is a schematic diagram of the distribution of power source high-potential signal lines in the backlight module provided by the embodiment of the present disclosure.

Specifically, as shown in FIG. 3, the light-emitting units 100 in a same column on the backplane 10 are connected to a same power source high-potential signal line. The power source high-potential signal line includes an in-plane wire 111 and a fan-out wire 112, and a width of the fan-out wire 112 corresponding to the first light-emitting unit 110 is larger than a width of the fan-out wire 112 corresponding to the second light-emitting unit 120. The part of the power source high-potential signal line in the plane is the in-plane wire 111. Each of the in-plane wires 111 is parallel to each other and is connected to the light-emitting units 100 in a column, respectively. Each of the in-plane wires 111 is connected to the connection terminal 40 through the fan-out wires 112 at the lower part of the backplane 10. A width of the fan-out wire 112 corresponding to the first light-emitting unit 110 is set to be greater than a width of the fan-out wire 112 corresponding to the second light-emitting unit 120, and thus the resistance value of the fan-out wire 112 corresponding to the first light-emitting unit 110 is smaller than the resistance value of the fan-out wire 112 corresponding to the second light-emitting unit 120, so that the resistance value of the first resistance R1 between the first light-emitting unit 110 and the power source high-potential signal input terminal is smaller than the resistance value of the second resistance R2 between the second light-emitting unit 120 and the power source high-potential signal input terminal, thereby achieving the purpose of increasing the brightness of the first light-emitting unit 110.

In addition, it is also possible to improve the dark lines of the seams by directly changing the mode of the first light-emitting unit 110. Lamps with bright brightness are disposed under the same voltage in the combining areas 11, while lamps with slightly dark brightness are disposed in the other areas 12. On the basis of the lamp mode replacements, the dark lines of the seams can be further improved by combining the differential settings of the resistance values in any of the above embodiments.

In the present disclosure, by the above methods, the resistance value of the first resistance R1 is set to be smaller than the resistance value of the second resistance R2, so that the voltage drop of the power source high-potential signal after passing through the first resistance R1 is smaller than the voltage drop of the power source high-potential signal after passing through the second resistance R2, the voltage difference across the first light-emitting unit 110 is greater than the voltage difference across the second light-emitting unit 120, and the brightness corresponding to the first light-emitting unit 110 is greater than the brightness corresponding to the second light-emitting unit 120. Thus, the overall brightness of the first light-emitting units 110 with large intervals therebetween in the combining areas 11 is equal to the overall brightness of the second light-emitting units 120 with small intervals therebetween in the other areas 12, which improves the display effect of the corresponding display device.

Figure 5:
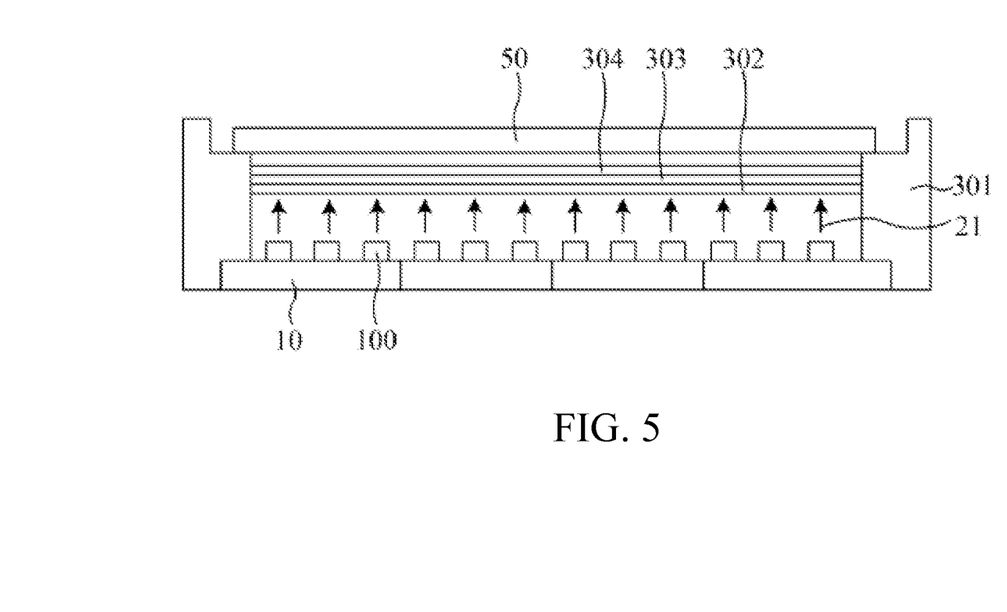
FIG. 5 is a structural schematic diagram of the display device provided by the embodiment of the present disclosure.

As shown in FIG. 5, the present disclosure further provides a display device, including a liquid crystal display panel 50 and a backlight module. The backlight module includes a plurality of backplanes 10 that are combined, a plastic frame 301, a diffusion plate 302, a reflective sheet 303, and an optical film 304. Each of the backplanes 10 is provided with a plurality of light-emitting units 100 arranged in an array. The liquid crystal display panel 50 is fixed on the plastic frame 301 of the backlight module through an adhesive layer (not shown). The light 21 emitted by the light-emitting unit 110 disposed on the backplane 201 in the backlight module passes through the diffusion plate 302, the reflective sheet 303, and the optical film 304, and then irradiates the liquid crystal display panel 50, wherein the light 21 first passes through a lower polarizer of the liquid crystal display panel 50 to become polarized light. The liquid crystal display panel 50 inputs data signal voltages of different magnitudes to each pixel through the switching function of TFT. The liquid crystal molecules rotate in different states under different voltages, and thus the degrees of transmission of the polarized light are different. Accordingly, the brightness of the light emitted through the upper polarizer is different, so as to achieve a multi-grayscale image display.

A backlight module in the display device of the present disclosure is the backlight module described in any of the above embodiments. By setting the resistance value of the first resistance to be smaller than the resistance value of the second resistance, the voltage drop of the power source high-potential signal after passing through the first resistance is smaller than the voltage drop of the power source high-potential signal after passing through the second resistance, the voltage difference across the first light-emitting unit is greater than the voltage difference across the second light-emitting unit, and the brightness corresponding to the first light-emitting unit is greater than the brightness corresponding to the second light-emitting unit, so that the overall brightness of the first light-emitting units with large intervals therebetween in the combining areas is equal to the overall brightness of the second light-emitting units with small intervals in the other areas, which improves the display effect of the display device.

According to the Above Embodiments

The present disclosure provides a backlight module and a display device having same. The backlight module comprises a plurality of backplanes that are combined. Each of the plurality of backplanes is provided with a plurality of light-emitting units arranged in an array, and the light-emitting units are electrically connected to a power source high-potential signal input terminal and a power source low-potential signal input terminal, for emitting light under control of a power source high-potential signal and a power source low-potential signal. The light-emitting units include a plurality of first light-emitting units located in combining areas of the adjacent backplanes, and a plurality of second light-emitting units located in the other areas of the backplanes. On at least one of the backplanes, a first resistance between the first light-emitting unit and the corresponding power source high-potential signal input terminal is smaller than a second resistance between the second light-emitting unit and the corresponding power source high-potential signal input terminal. In the present disclosure, the resistance value of the first resistance is set to be smaller than the resistance value of the second resistance, so that the voltage drop of the power source high-potential signal after passing through the first resistance is smaller than the voltage drop of the power source high-potential signal after passing through the second resistance, the voltage difference across the first light-emitting unit is greater than the voltage difference across the second light-emitting unit, and the brightness corresponding to the first light-emitting unit is greater than the brightness corresponding to the second light-emitting unit. Accordingly, the overall brightness of the first light-emitting units with large intervals therebetween in the combining areas and the overall brightness of the second light-emitting units with small intervals therebetween in the other areas are equal, which improves the display effect of the corresponding display device.

In the aforementioned embodiments, the description of each embodiment has its own emphasis. For a part that is not detailed in an embodiment, refer to related descriptions in other embodiments.

The backplane module and the display device having same provided in the embodiments of the present disclosure are described in detail above. Specific embodiments are used herein to explain the principles and implementation of the present disclosure. The above embodiments are used to assist in understanding the technical solutions and the core ideas of this disclosure. Those of ordinary skill in the art should understand that the technical solutions described in the foregoing embodiments can be modified, or some of the technical features can be replaced. These modifications and replacements do not substantially deviate the corresponding technical solutions from the scopes of the technical solutions of the embodiments of the present disclosure.

What is claimed is:

1. A backlight module, comprising: a plurality of backplanes that are combined;
   wherein each of the plurality of backplanes is provided with a plurality of light-emitting units arranged in an array, and the light-emitting units are electrically connected to a power source high-potential signal input terminal and a power source low-potential signal input terminal, for emitting light under control of a power source high-potential signal and a power source low-potential signal;
   wherein the light-emitting units comprise a plurality of first light-emitting units located in combining areas of adjacent backplanes, and a plurality of second light-emitting units located in other areas of the backplanes;
   wherein on at least one of the backplanes, a first resistance between the first light-emitting unit and the corresponding power source high-potential signal input terminal is smaller than a second resistance between the second light-emitting unit and the corresponding power source high-potential signal input terminal.

2. The backlight module of claim 1, wherein the plurality of backplanes are respectively electrically connected to corresponding driving chips through printed circuit boards, and the first resistance and the second resistance are both external resistances provided in the printed circuit board.

3. The backlight module of claim 2, wherein the first resistance is a variable resistance, and the second resistance is a fixed resistance.

4. The backlight module of claim 3, wherein each one of the driving chips is configured to control and adjust an actual access resistance value of the first resistance during a working phase of the first light-emitting unit.

5. The backlight module of claim 4, wherein each one of the driving chips is configured to, according to a brightness difference between the combining areas and the other areas, query a resistance compensation value corresponding to the brightness difference from a locally stored resistance compensation comparison table, and the resistance compensation value is subtracted from a resistance value of the second resistance to obtain a resistance value of the first resistance.

6. The backlight module of claim 4, wherein each one of the driving chips is configured to, according to a brightness difference between the combining areas and the other areas, calculate and obtain a resistance compensation value corresponding to the brightness difference, and the resistance compensation value is subtracted from a resistance value of the second resistance to obtain a resistance value of the first resistance.

7. The backlight module of claim 1, wherein a resistance of a connecting line between the first light-emitting unit and the corresponding power source high-potential signal input terminal forms the first resistance, and a resistance of a connecting line between the first light-emitting unit and the corresponding power source high-potential signal input terminal forms the second resistance.

8. The backlight module of claim 7, wherein for the backplanes, the light-emitting units in a same column are connected to a same power source high-potential signal line, the power source high-potential signal line comprises an in-plane wire and a fan-out wire, and a width of the fan-out wire corresponding to the first light-emitting unit is larger than a width of the fan-out wire corresponding to the second light-emitting unit.

9. The backlight module of claim 1, wherein for two adjacent backplanes, a resistance value of the first resistance corresponding to any one of the two adjacent backplanes is greater than a resistance value of the second resistance corresponding to the same backplane.

10. The backlight module of claim 9, wherein resistance values of the first resistances respectively corresponding to the two adjacent backplanes are equal.

11. The backlight module of claim 1, wherein for two adjacent backplanes, a resistance value of the first resistance corresponding to a first one of the two adjacent backplanes is smaller than a resistance value of the second resistance corresponding to the first one of the two adjacent backplane, and a resistance value of the first resistance corresponding to the second one ether backplane is equal to a resistance value of the second resistance corresponding to the second one of the two adjacent backplane.

12. The backlight module of claim 1, wherein for the backplanes, the power source low-potential signals corresponding to each of the light-emitting units are all equal.

13. The backlight module of claim 1, wherein each of the backplanes further comprises a backlight driving circuit for driving the light-emitting units to emit light, and the backlight driving circuit comprises:
   a data signal input module, configured to input a data signal under control of a scanning signal;
   a driving module, connected to the data signal input module, wherein the driving module is configured to drive the light-emitting units to emit light under control of the data signal and the power source high-potential signal; and
   a storage module, connected to the data signal input module and the driving module, wherein the storage module is configured to store the data signal.

14. The backlight module of claim 1, wherein each of the light-emitting units comprises a plurality of Mini LED lamps connected in series.

15. A display device, comprising: a liquid crystal display panel and a backlight module, wherein the backlight module comprises a plurality of backplanes that are combined, each of the backplanes is provided with a plurality of light-emitting units arranged in an array, and the plurality of light-emitting units are electrically connected to a power source high-potential signal input terminal and a power source low-potential signal input terminal, for emitting light under control of a power source high-potential signal and a power source low-potential signal, wherein the light-emitting units comprise a plurality of first light-emitting units located in combining areas of adjacent backplanes, a plurality of second light-emitting units located in other areas of the backplanes, and on at least one of the backplanes, a first resistance between the first light-emitting unit and the corresponding power source high-potential signal input terminal is smaller than a second resistance between the second light-emitting unit and the corresponding power source high-potential signal input terminal.

16. The display device of claim 15, wherein the plurality of backplanes are respectively electrically connected to corresponding driving chips through printed circuit boards, and the first resistance and the second resistance are both external resistances provided in the printed circuit.

17. The display device of claim 16, wherein the first resistance is a variable resistance, and the second resistance is a fixed resistance.

18. The display device of claim 17, wherein each one of the driving chips is configured to control and adjust an actual access resistance value of the first resistance during a working stage of the first light-emitting unit.

19. The display device of claim 18, wherein each one of the driving chips is configured to, according to a brightness difference between the combining areas and the other areas, query a resistance compensation value corresponding to the brightness difference from a locally stored resistance compensation comparison table, and the resistance compensation value is subtracted from a resistance value of the second resistance to obtain a resistance value of the first resistance.

20. The display device of claim 18, wherein each one of the driving chips is configured to, according to a brightness difference between the combining area and the other area, calculate and obtain a resistance compensation value corresponding to the brightness difference, and the resistance compensation value is subtracted from a resistance value of the second resistance to obtain a resistance value of the first resistance.

* * * * *